US005750453A

United States Patent [19]

Easley et al.

[11] Patent Number: 5,750,453
[45] Date of Patent: May 12, 1998

[54] HIGH SURFACE AREA MEIXNERITE FROM HYDROTALCITES INFILTRATED WITH METAL SALTS

[75] Inventors: Michael A. Easley, Arnold; William E. Horn, Jr., Gibsonia, both of Pa.

[73] Assignee: Aluminum Company of America, Pittsburgh, Pa.

[21] Appl. No.: 771,461

[22] Filed: Dec. 20, 1996

[51] Int. Cl.$^6$ ................................................ B01J 21/02
[52] U.S. Cl. ........................ 502/84; 502/176; 502/328; 502/332; 502/335; 502/336; 502/341; 502/346; 502/414; 423/600
[58] Field of Search ................................ 502/84, 176, 328, 502/332, 335, 336, 341, 346, 414; 423/600

[56] References Cited

U.S. PATENT DOCUMENTS

| Re. 34,164 | 1/1993 | Misra ................................ 423/115 |
| 4,902,660 | 2/1990 | Delzer et al. ....................... 502/174 |
| 5,079,203 | 1/1992 | Pinnavaia et al. .................... 502/84 |
| 5,600,000 | 2/1997 | King .................................. 564/480 |
| 5,645,810 | 7/1997 | Easley ............................... 423/600 |

OTHER PUBLICATIONS

Shen, J. et al., "Synthesis and Surface Acid/Base Properties of Magnesium–Aluminum Mixed Oxides Obtained from Hydrotalcites", *Langmuir*, vol. 10, No. 10, 1994, pp. 3902 3908. (No Month).

Mascolo, G. et al, "A New Synthesis and Characterization of Magnesium–Aluminum Hydroxides", *Mineralogical Magazine*, Mar. 1980, vol. 43, pp. 619–621.

Pausch, I. et al, "Syntheses of Discordered and Al–Rich Hydrotalcite–Like Compounds", *Clay and Clay Minerals*, vol. 34, No. 5, 1986, pp. 507–510. (No Month).

Dimotakis, E. et al, "Communications" *Inorganic Chemistry*, vol. 29, No. 13, Jun. 27, 1990, pp. 2393–2394.

*Primary Examiner*—Shrive Beck
*Assistant Examiner*—Timothy Meeks
*Attorney, Agent, or Firm*—Tracey D. Beiriger

[57] ABSTRACT

A method for making a synthetic mixed metal oxide or meixnerite which, when activated, has a high B.E.T. surface area, typically about 290 m$^2$/g or greater. The method comprises activating hydrotalcite, then cooling and hydrating such activated material with a metal salt solution in a carbon dioxide-free environment. Such hydration can produce a material that absorbs more than 100% of its weight in water. Following hydration, this material is activated a second time in a virtually carbon dioxide-free environment. Such reactivation decomposes the salt and leaves a supported metal oxide readily available to be used for catalyst reactions.

34 Claims, 7 Drawing Sheets

HIGH SURFACE AREA MEIXNERITE FROM HYDROTALCITES INFILTRATED WITH METAL SALTS

BACKGROUND OF THE INVENTION

1. Field of the Invention

This invention relates to the field of making mixed metal hydroxides or layered double hydroxide compounds. More specifically, the invention relates to an improved high surface area synthetic meixnerite product made from hydrotalcites infiltrated with metals salts and method for making the same.

2. Technology Review

Naturally occurring meixnerite exists as a secondary mineral in the cracks of serpentine rocks near Ybbs, Persenberg in lower Austria. In its crystalline state, such meixnerite material is tabular, colorless and has perfect basal cleavage. Natural meixnerite is closely related to hydrotalcite and pyroaurite in overall structure. It has an infrared absorption spectrum that compares favorably with those for hydrotalcite and other synthetic magnesium-aluminum double hydroxides. Hydrotalcite ideally has the formula $Mg_6Al_2(OH)_{16}CO_3 \cdot 4H_2O$. Synthetic hydrotalcites generally have the formula $[Mg_{1-x}Al_x(OH)_2]x+(CO3^{n-}{}_{x/n}) \cdot mH_2O$ where x may very over a range of approximately 0.1 to 0.50 corresponding to magnesium to aluminum ratios as high as 9 and as low as 1.0. Others in the literature have claimed to synthesize hydrotalcites with magnesium to aluminum ratios as high as 12 and as low as 0.5 (see Shen et al, "Synthesis and Surface Acid/Base Properties of Magnesium-Aluminum Mixed Oxides Obtained From Hydrotalcites", Langmuir, Vol. 10, 1994). In some circles, meixnerite is even listed among other hydrotalcite-like materials, or grouped in the broader family of "hydrotalcites". Under the latter definition, meixnerite is a carbonate-free member of the hydrotalcite family which has only hydroxy anions. Still others refer to meixnerite as an all hydroxyl, layered double hydroxide.

Meixnerite, or magnesium aluminum hydroxide hydrate, is often symbolized by the formula $Mg_6Al_2(OH)_{18} \cdot 4H_2O$, although still other formulaic representations include: $Mg_4Al_2(OH)_{14} \cdot 3H_2O$ and $[Mg_3Al(OH)_8]OH \cdot 2H_2O$. Hydrotalcite and meixnerite share the same general X-ray diffraction pattern.

The synthesis of meixnerite is fairly new and the following various methods of manufacture do not appear to be commonly practiced or commercially practical. In March 1980, G. Mascolo et al described a synthesis process in *Mineralogical Magazine* whereby magnesium oxide, decomposed from basic magnesium carbonate at 650° C. for 6 hours, was combined with an alumna gel and rotated in an air thermostated oven for one week at 80° C. The resulting product was then dried over silica gel. It was analyzed to contain some brucite compound and about 0.8–1.0 wt. % carbon dioxide.

Six years later, I. Pausch et al wrote of a variation on the aforementioned process in *Clay and Clay Minerals*. Therein, magnesium oxide, annealed at 1050° C., was combined with an alumina gel ($\delta$—$Al_2O_3$), $MgC_2O_4 \cdot 2H_2O$ and distilled water. This combination was heated to between 100°–350° C. at a pressure of 100 MPa for various reaction times ranging from 7 to 42 days. IR spectroscopy analysis of the resulting product showed some carbonate contamination, but at an intensity of less than 5% as compared to natural hydrotalcite.

From a series of experiments reported by E. Dimotakis et al in *Inorganic Chemistry*, Vol. 29, No. 13 (1990), synthetic meixnerite was prepared by calcining a hydrotalcite of the formula $[Mg_3Al(OH)_8][CO_3]_{0.5} \cdot 2H_2O$ at 500° C. to form a metal oxide solution. This oxide was then hydrolyzed at 25° C. in a carbon dioxide-free environment.

It is a principal objective of this invention to provide a means for making a synthetic meixnerite which, when activated, has a B.E.T. surface area of about 290 or greater. It is another objective to make a synthetic meixnerite that consists of a double layered hydroxide with 100% or more of its weight in water. It is still another objective to make a high surface area synthetic meixnerite that when activated may be capable of catalyzing chemical reactions with or without supported metals. It is another objective to provide a method for making a synthetic meixnerite capable of adsorbing gases like $CO_2$. It is still another objective to provide a process for synthesizing meixnerite with supported metals from various hydrotalcites. It is still another objective to create a hydrotalcite-like compound having significantly lower carbonate levels and virtually no other anion contamination. It is still another objective to provide a method for making high surface area synthetic meixnerite which is not dependent on the use of alumina gels.

On a preferred basis, synthetic meixnerite can be made from fairly inexpensive and readily available reactants by this process, thus making it suitable for the commercial scale production.

With respect to the improvement of the high surface area synthetic meixnerite, it is a further objective to produce such an activated synthetic meixnerite having supported metal thereon. It is another objective to make a mixed metal oxide containing a support metal thereon for use as a catalyst.

SUMMARY OF THE INVENTION

In accordance with the foregoing objectives, there is provided a method for making a mixed metal hydroxide such as a synthetic meixnerite which, when activated, has a high surface area. The method comprises activating hydrotalcite, then cooling and hydrating such activated material with a metal salt solution in a carbon dioxide-free environment. Such hydration can produce a material that absorbs more than 100% of its weight. Following hydration, this material is activated a second time in a virtually carbon dioxide-free environment. Such reactivation decomposes the salt and leaves a supported metal oxide or a metal sulfate. Thus, this second activation creates an activated meixnerite product (mixed metal oxide) with a B.E.T. surface area of about 290 m²/g or greater readily available to be used for catalyst reactions. While many references throughout the specification are solely to meixnerite, it is to be understood that this invention should analogously apply to other mixed metal hydroxides.

DETAILED DESCRIPTION OF PREFERRED EMBODIMENTS

Figure 1:
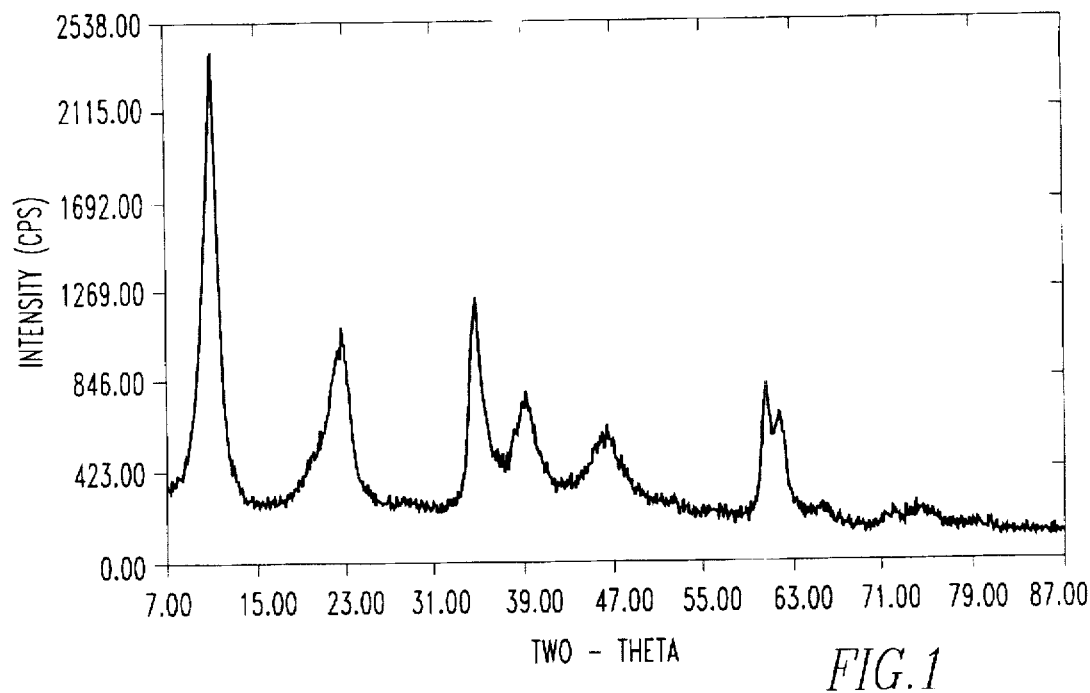
FIG. 1 is the X-ray diffraction pattern of the meixnerite of Example 1 made from hydrotalcite B, activated to 600° C. and using liquid nickel nitrate solution hydration.

Meixnerite of the present invention is synthesized from a metal hydroxide compound or a layered double hydroxide compound. More specifically, the meixnerite is a mixed magnesium-aluminum hydroxide prepared from one or more hydrotalcite compounds. A preferred way of comparing such materials uses the Brunauer-Emmett-Teller (or B.E.T.) surface area measurement method. This invention provides an activated synthetic meixnerite having a B.E.T. surface area of about 290 m²/g or greater.

Typical activation of a hydrotalcite material between about 500° to 1000° C. produces a material with a B.E.T. surface area in the range of about 140 to 230 m²/g. The following table lists actual B.E.T. surface area measurements of one of the hydrotalcites used in the examples of this invention.

TABLE 1

Hydrotalcite A Activation Surface Areas

| Activation Temperature (°C.) | B.E.T. Surface Area (m²/g) |
|---|---|
| 100 | 26 |
| 150 | 24 |
| 200 | 25.5 |
| 300 | 30.5 |
| 400 | 83 |
| 425 | 134 |
| 450 | 139.5 |
| 500 | 178 |
| 550 | 213.5 |
| 600 | 210.5 |
| 650 | 220.5 |
| 700 | 226.5 |
| 800 | 231.5 |
| 900 | 202.5 |
| 1000 | 140 |

The method of this invention includes first activating a hydrotalcite to about 600° C. and then hydrating the activated material with a metal salt solution in a substantially carbon dioxide-free environment. The resulting material is then activated at one or more temperatures between about 500° and 850° C. in a substantially carbon dioxide-free environment to produce a mixed metal oxide having a surface area that exceeds about 290 m²/g.

During the first step of hydrotalcite activation, most of the physi-sorbed and chemi-sorbed water and carbon dioxide from the hydrotalcite structure are desorbed or removed. This reaction preferably proceeds at one or more temperatures between about 500° and 850° C. When this activated material is hydrated with a metal salt solution in a substantially carbon dioxide-free environment, the reaction which is believed to take place may be summarized by the following formula:

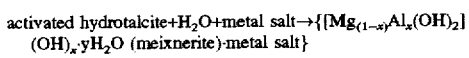

activated hydrotalcite+$H_2O$+metal salt→{$[Mg_{(1-x)}Al_x(OH)_2]$ $(OH)_x \cdot yH_2O$ (meixnerite)·metal salt}

Following hydration, the resulting mixed metal meixnerite is activated to yield a high surface area mixed metal oxide, that is, an activated meixnerite containing a metal oxide or metal sulfate. Mixed metal meixnerite is used herein to mean the product obtained from the process of contacting an activated layered double hydroxide with a metal salt solution.

Experiments were conducted using two representative hydrotalcites; namely, hydrotalcites A and B for starting material when processed by the preferred hydration mechanisms summarized above. Both materials were synthesized by Alcoa. Hydrotalcite A, as manufactured by the process set forth in U.S. Reissue No. 34,164, the disclosure of which is fully incorporated by reference herein, has an Mg/Al molar ratio of 2.0. Hydrotalcite B, as manufactured by the process set forth in U.S. application Ser. No. 290,220, the disclosure of which is fully incorporated herein by reference, has an Mg/Al molar ratio of 1.0. Both of these hydrotalcites resulted in an activated meixnerite-based end product with a B.E.T. surface area greater than 290 m²/gram. Hydrotalcites manufactured via other processes may also be suitable as a base material. Also, hydrotalcites having other intercalated anions which decompose upon activation may be suitable precursors.

At elevated temperatures, these high surface area activated meixnerites should have excellent catalytic activity because of the large surface area. Such properties make the products of this invention suitable for many end uses. For example, these activated meixnerites may be used as $CO_2$ gas adsorbents or for catalytic reactions. Further, because of the metal content, these activated meixnerites may be used for catalyst reactions. The resulting high surface area materials containing metals are strong candidates for catalyst activities. Supported metals is used herein to mean the metal additive of the metal salt solution that is finely dispersed during hydration throughout the resultant material.

EXAMPLES

The hydrotalcites for the following examples were activated by heating. Hydration methods were also employed using various metal salt solution mediums for the substantially carbon dioxide-free environments employed herein.

For comparison purposes, Examples 1 through 6 were conducted using alternate base materials as well as varying hydration mediums. As demonstrated in the experiments reported by E. Dimotakis et al in *Inorganic Chemistry*, Vol. 29, No. 13 (1990), when using a liquid hydration medium, the material prior to hydration had a solid weight ratio of 2%. However, it is expected that other weight ratio percentages will also work in accordance with this invention.

All examples for this application used nickel, copper, cobalt and iron nitrate or iron sulfate solutions for rehydration. However, it is expected that other transition metal salt/sulfate solutions will also work in accordance with this invention.

EXAMPLE 1

Hydrotalcite B Activated to 600° C., Nickel Nitrate Solution Hydration

Hydrotalcite B was activated to about 600° C. Activation was performed in air in a Fisher Scientific ashing furnace with a ramp rate of 10° C./minute. After reaching a temperature of 600° C., the material was held for one additional hour at 600° C. The activated material was then cooled to room temperature in a substantially carbon dioxide-free environment. Once cooled, the material was hydrated in a solution containing nickel nitrate. The Solution was kept substantially carbon dioxide-free. This liquid phase hydration involves plunging cooled activated hydrotalcite material into a container of nickel nitrate hexahydrate and double deionized water which is treated deionized water that is virtually carbon dioxide-free. Specifically, one gram of 600° C. activated Hydrotalcite B was added to a double deionized water solution containing 0.4740 grams of nickel nitrate hexahydrate. The hydration was allowed to continue for 16 hours after which time the sample was filtered and then dried in a substantially carbon dioxide-free environment. This resulted in a flowable mixed metal meixnerite material. The powder had a light green color. The initial nickel nitrate solution was bright green while the final solution (or filtrate) was crystal clear indicating that the activated hydrotalcite had absorbed all of the nickel nitrate. The XRD pattern of the resulting material is shown in FIG. 1. On an activated weight basis, this mixed metal meixnerite material readsorbed approximately up to 120% of its original weight.

Figure 2:
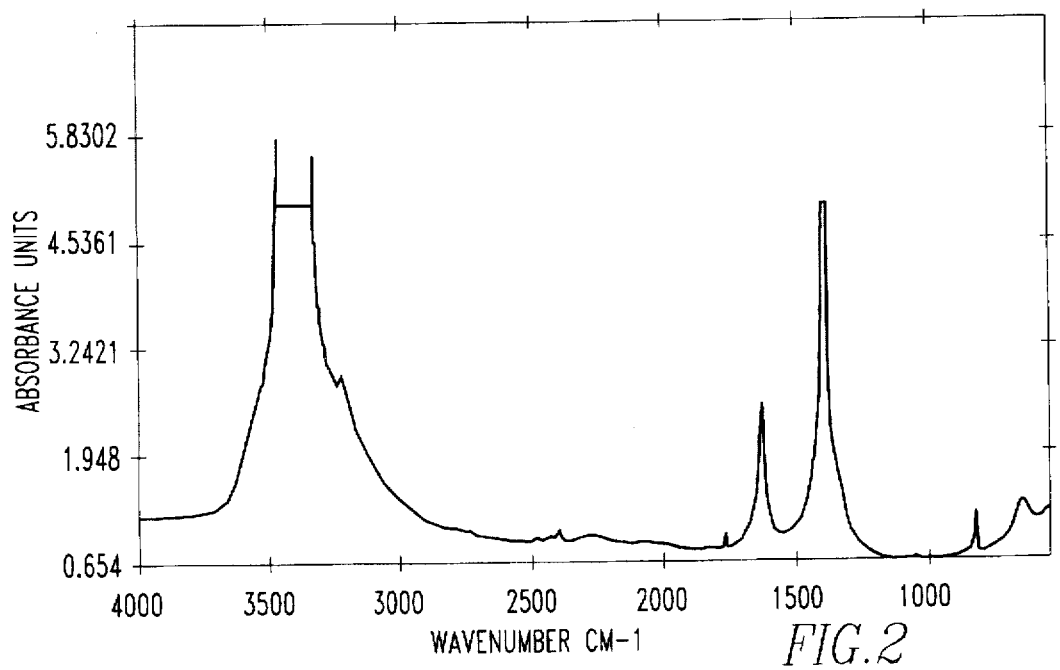
FIG. 2 is the FTIR analysis of a sample of pure nickel nitrate hexahydrate such as that used for hydration in Example 1.
Figure 3:
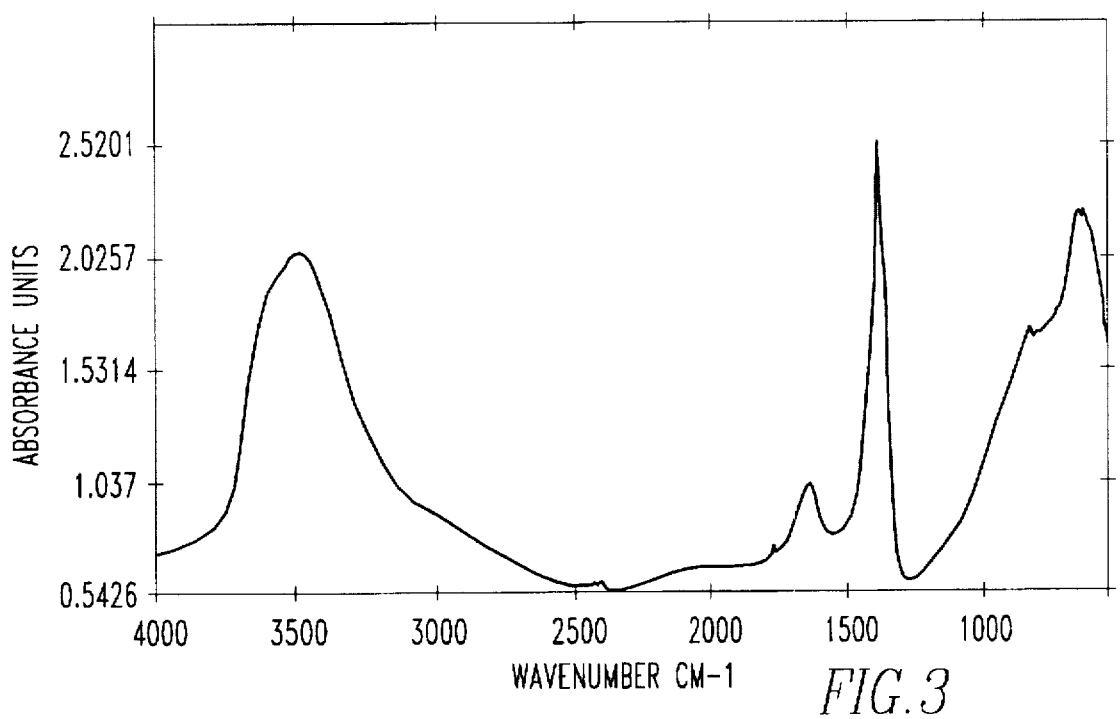
FIG. 3 is the FTIR analysis of a sample of nickel nitrate loaded meixnerite.
Figure 4:
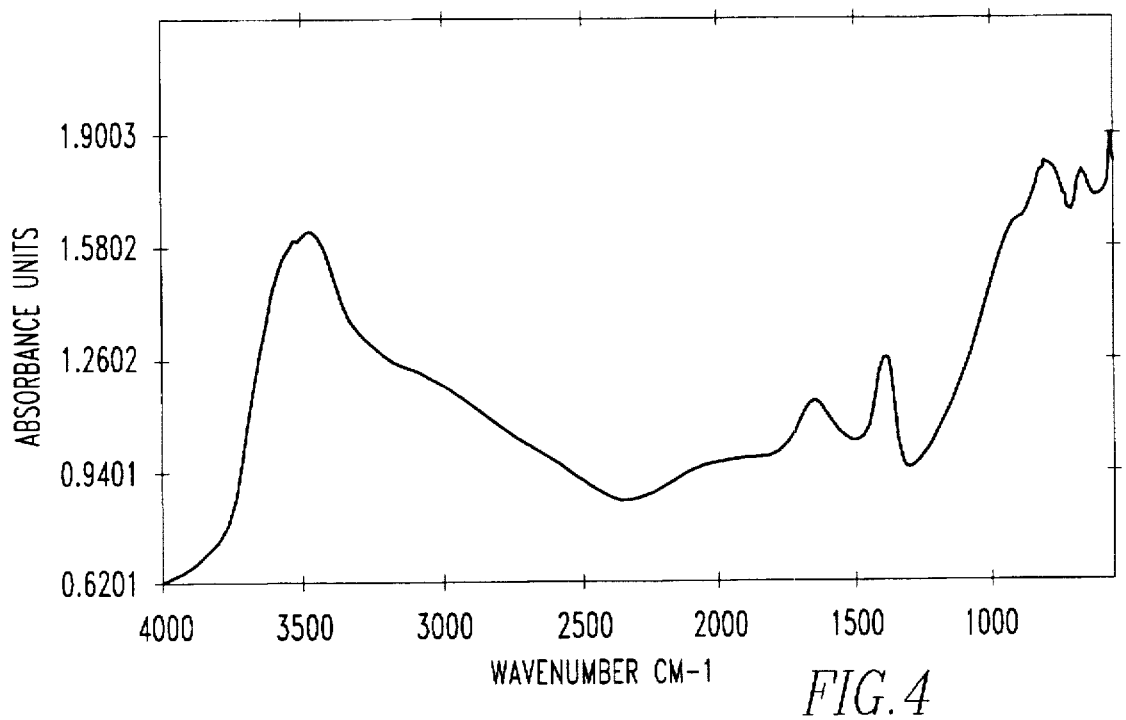
FIG. 4 is the FTIR analysis of ordinary meixnerite.

The sample was further characterized with Fourier Transformed Infrared (FTIR) analyses. FIG. 2 shows the analysis of a sample of pure nickel nitrate hexahydrate (EM Science). FIG. 3 shows the FTIR analysis of a sample of nickel nitrate loaded meixnerite. FIG. 4 shows the FTIR analysis of meixnerite. Very small "horn" peaks at 2700, 1750 and 900 wavenumber $cm^{-1}$ are important indicators of nickel nitrate hexahydrate. The main indicator peak is at 1400 $cm^{-1}$. The FTIR analyses clearly indicate that nickel nitrate is present in the loaded meixnerite sample and is not present in the ordinary meixnerite sample.

Figure 5:
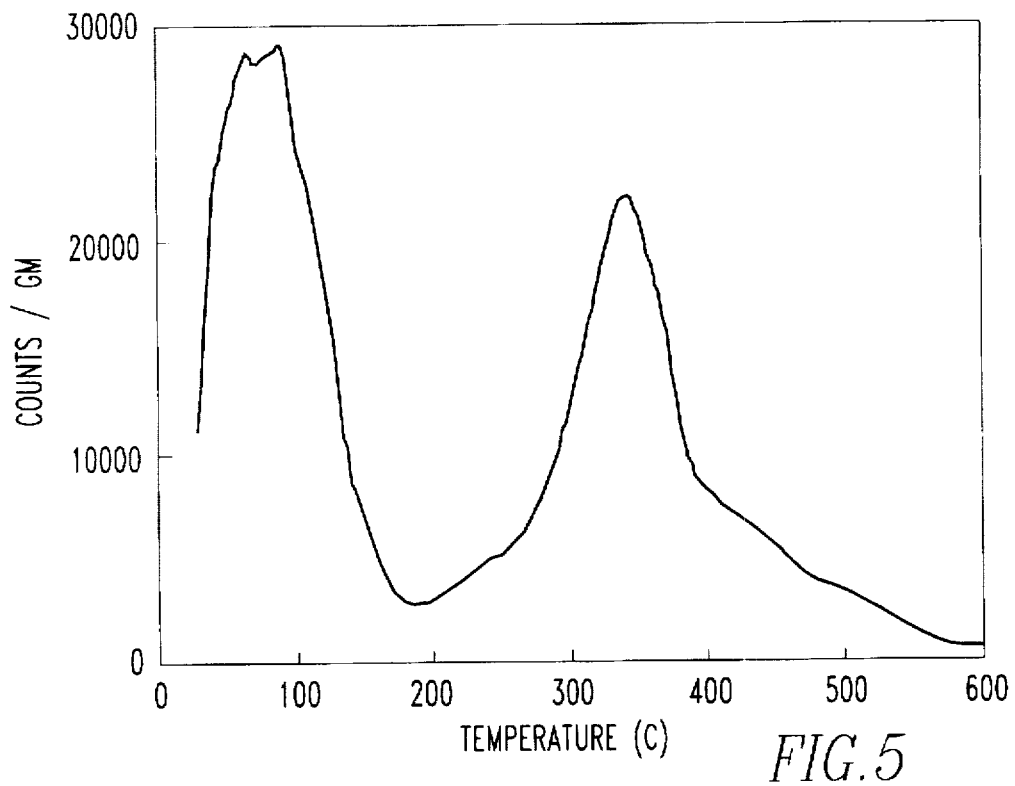
FIG. 5 is a graph showing the temperature at which the nickel nitrate loaded meixnerite of Example 1 desorbs.

Following hydration, filtering and drying, the mixed metal meixnerite material was activated to a temperature of 600° C. and held there for 10 minutes using an Altamira Instruments AMI-1 ("AMI-1"). In this device, the activated sample is not exposed to air between activation and taking of surface area measurements. The Temperature Programmed Desorption (TPD) graph is included as FIG. 5. This shows the thermal conductivity signal versus temperature. The activated meixnerite's B.E.T. surface area was measured after cooling and found to be 352 $m^2/g$ using the AMI-1. Inductively Coupled Plasma (ICP) results indicate that the sample had a nickel content of 8.42% (activated weight basis).

EXAMPLE 2

Hydrotalcite B Activated to 600° C., Cobalt Nitrate Solution Hydration

Figure 6:
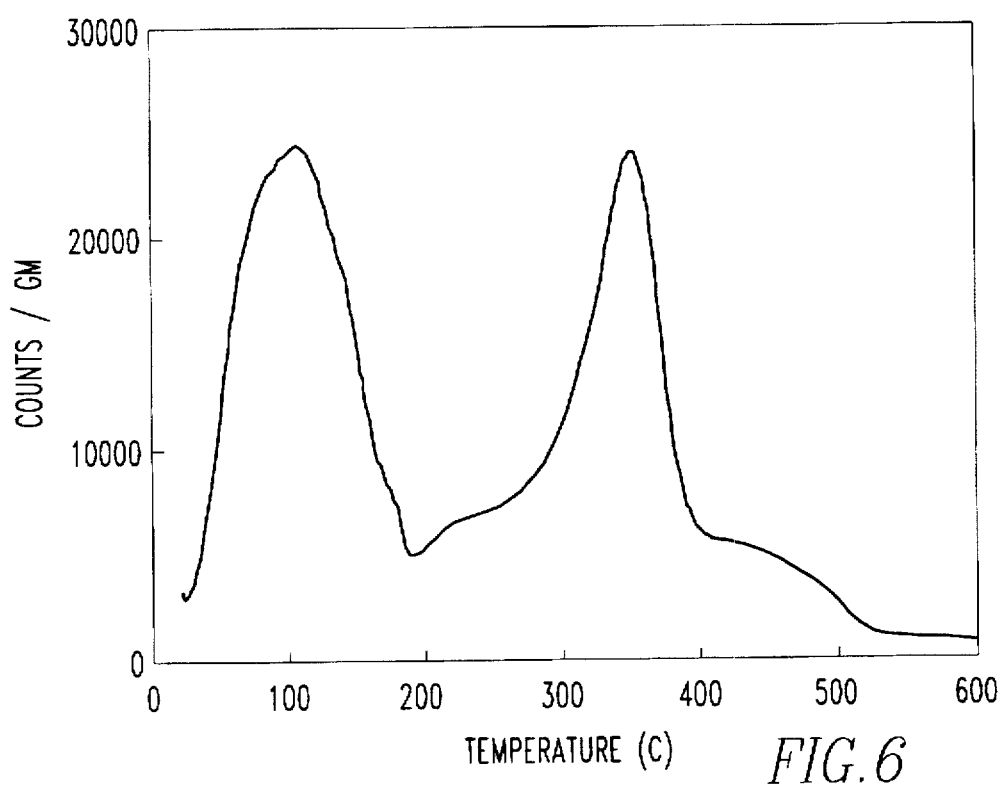
FIG. 6 is a graph showing the temperature at which the cobalt nitrate loaded meixnerite of Example 2 desorbs.
Figure 7:
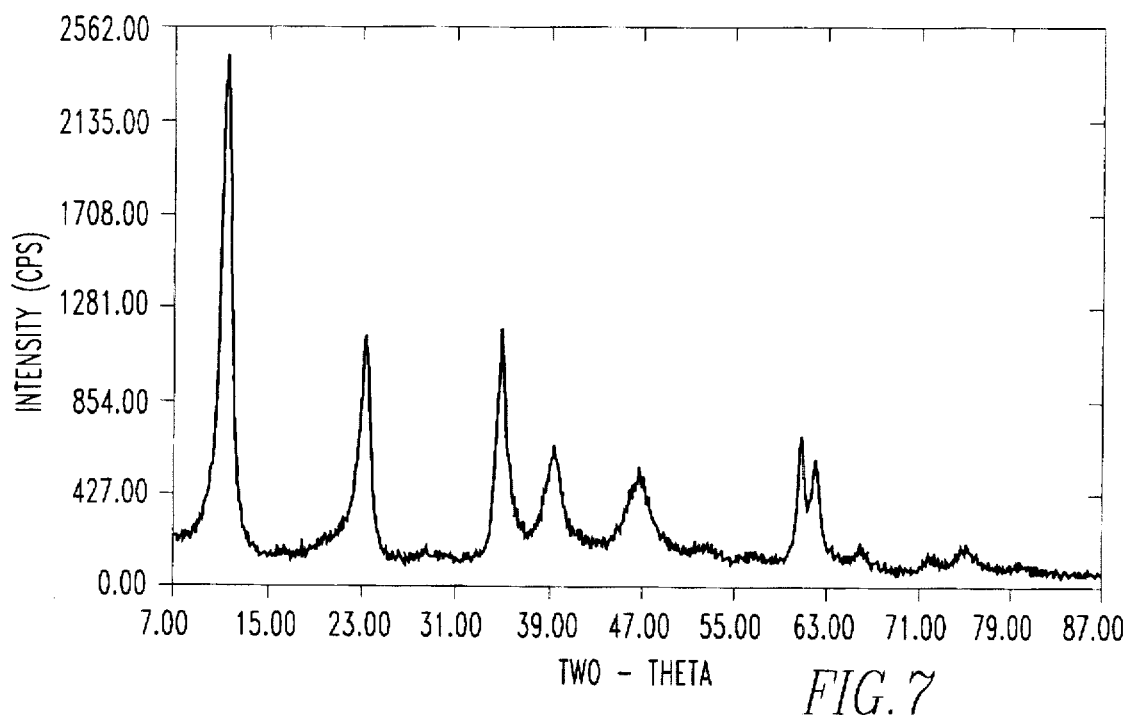
FIG. 7 is the X-ray diffraction pattern of the meixnerite of Example 2 made from hydrotalcite B, activated to 600° C. and using liquid cobalt nitrate solution hydration.

Basically the same experiment as in Example 1 was re-run using a hydration solution containing cobalt nitrate. One gram of 600° C. activated hydrotalcite B was added to a double deionized water solution containing 0.2509 grams of cobalt II nitrate hexahydrate to prepare the solution. The hydration solution was red. After hydration, filtering and drying, the powder had a pink color. The filtrate was crystal clear indicating that the cobalt nitrate had been adsorbed. The resulting 600° C. activated mixed metal meixnerite (mixed metal oxide) material had a measured B.E.T. surface area of 379 $m^2/g$. The TPD graph is shown in FIG. 6. Analytical results indicate that the sample had a cobalt content of 4.42% (activated weight basis). The XRD pattern as shown in FIG. 7 indicates that the resulting material is an activated mixed metal meixnerite-type material.

EXAMPLE 3

Hydrotalcite B Activated to 600° C., Cupric Nitrate Solution Hydration

Figure 8:
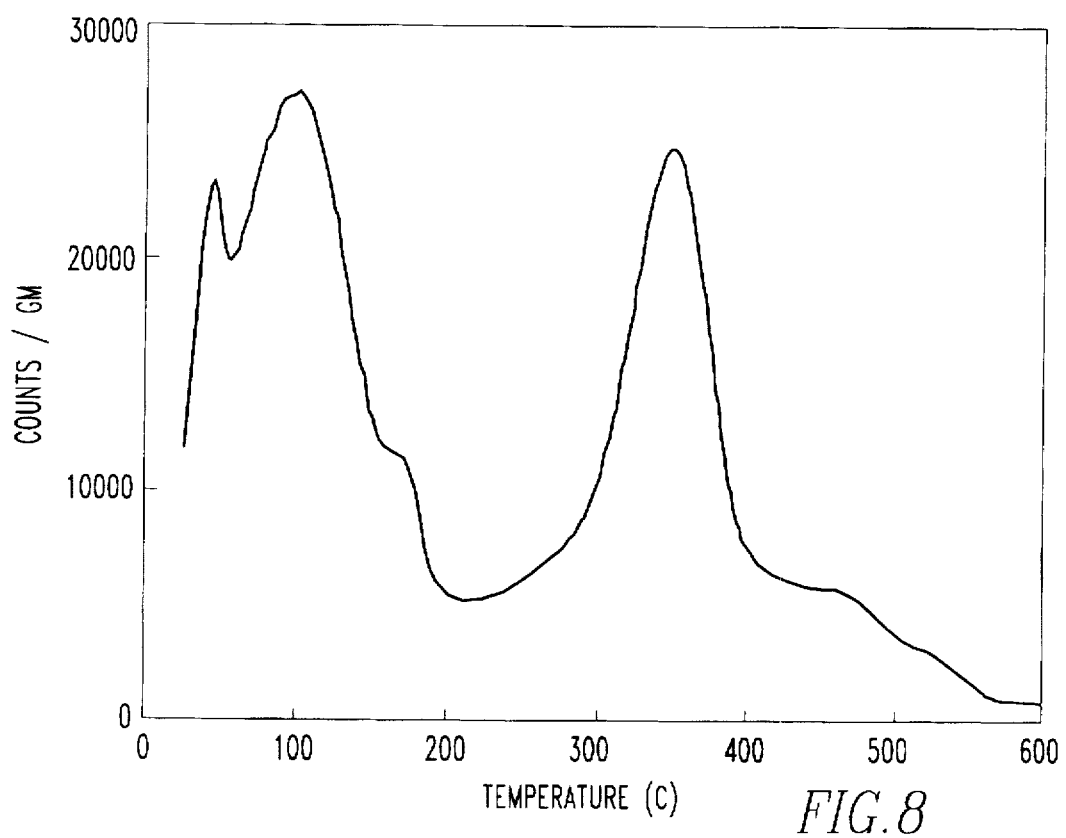
FIG. 8 is a graph showing the temperature at which the cupric nitrate loaded meixnerite of Example 3 desorbs.
Figure 9:
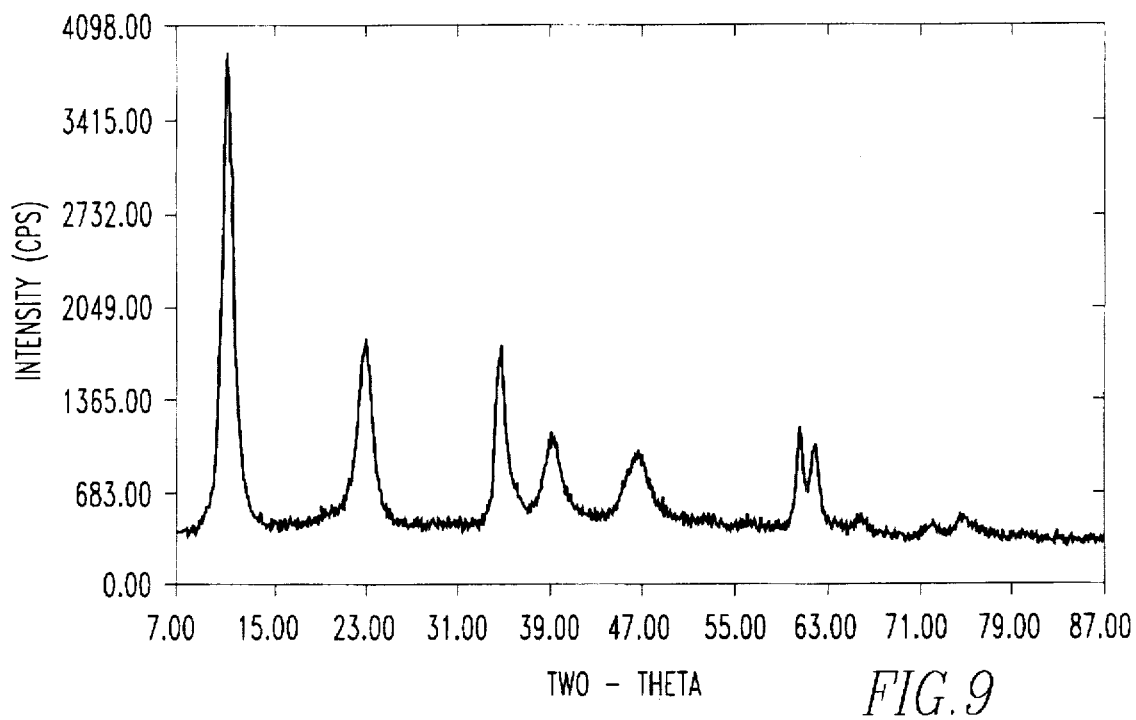
FIG. 9 is the X-ray pattern of the meixnerite of Example 3 made from hydrotalcite B, activated to 600° C. and using liquid cupric nitrate solution hydration.

Basically the same experiment as in Example 1 was re-run using a hydration solution containing copper (II) nitrate. One gram of 600° C. activated hydrotalcite B was added to a double deionized water solution containing 0.2094 grams of cupric nitrate·2.5 $H_2O$. The hydration solution had a dark blue color. After hydration, filtering and drying, the powder had a light blue color. The filtrate was crystal clear indicating that the cupric nitrate had been adsorbed. The resulting 600° C. activated mixed metal meixnerite material had a measured B.E.T. surface area of 343 $m^2/g$. Analytical results indicate that the sample had a copper content of 4.83% (activated weight basis). The TPD pattern is shown in FIG. 8. The XRD pattern as shown in FIG. 9, indicates that the resulting material is a mixed metal meixnerite material.

EXAMPLE 4

Hydrotalcite B Activated to 600° C., Iron Nitrate Solution Hydration

Figure 10:
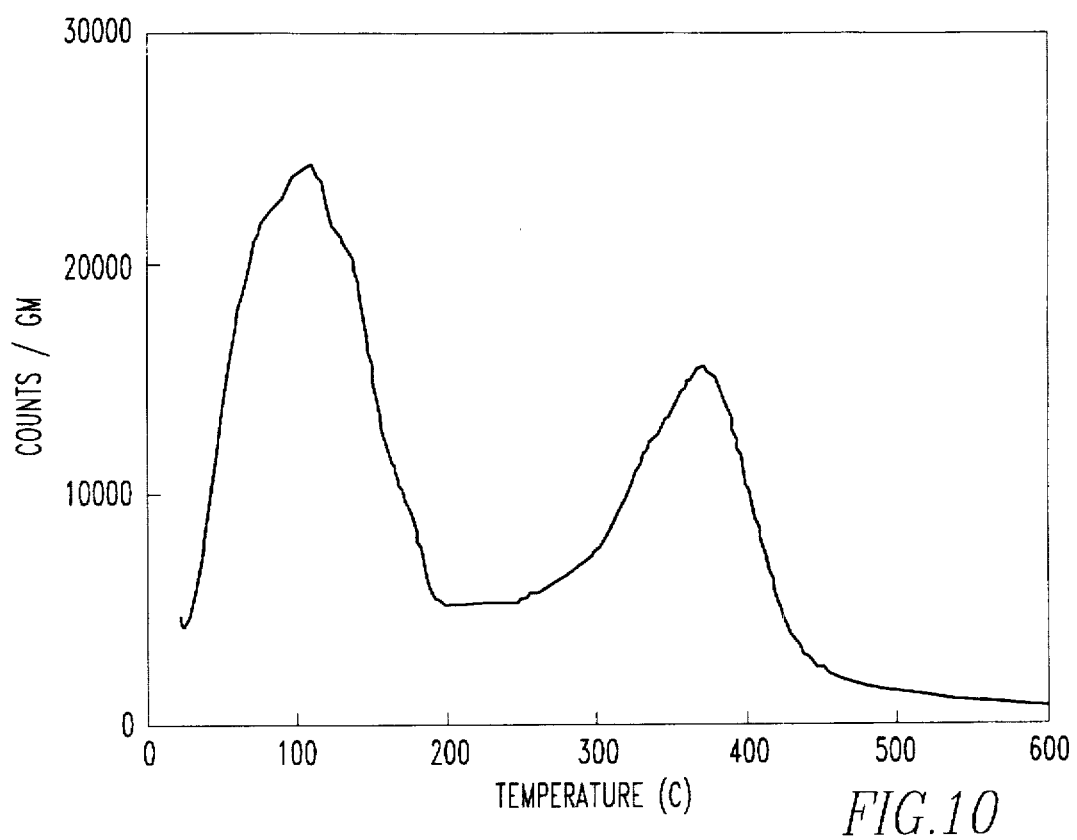
FIG. 10 is a graph showing the temperature at which the iron nitrate loaded meixnerite of Example 4 desorbs.

Basically the same experiment as in Example 1 was re-run using a hydration solution containing iron (III) nitrate. One gram of 600° C. activated hydrotalcite A was added to a double deionized water solution containing 0.3435 grams of ferric nitrate·9 $H_2O$. After hydration, filtering and drying, the powder had a light brown coloration. The filtrate was crystal clear indicating that the iron nitrate had been adsorbed. The resulting 600° C. activated mixed metal meixnerite had a measured B.E.T. surface area of 322 $m^2/g$. Analytical results indicated that the sample had an iron content of 5.96% (activated weight basis). The TPD pattern is shown in FIG. 10.

EXAMPLE 5

Hydrotalcite A Activated to 600° C., Nickel Nitrate Solution Hydration

Figure 11:
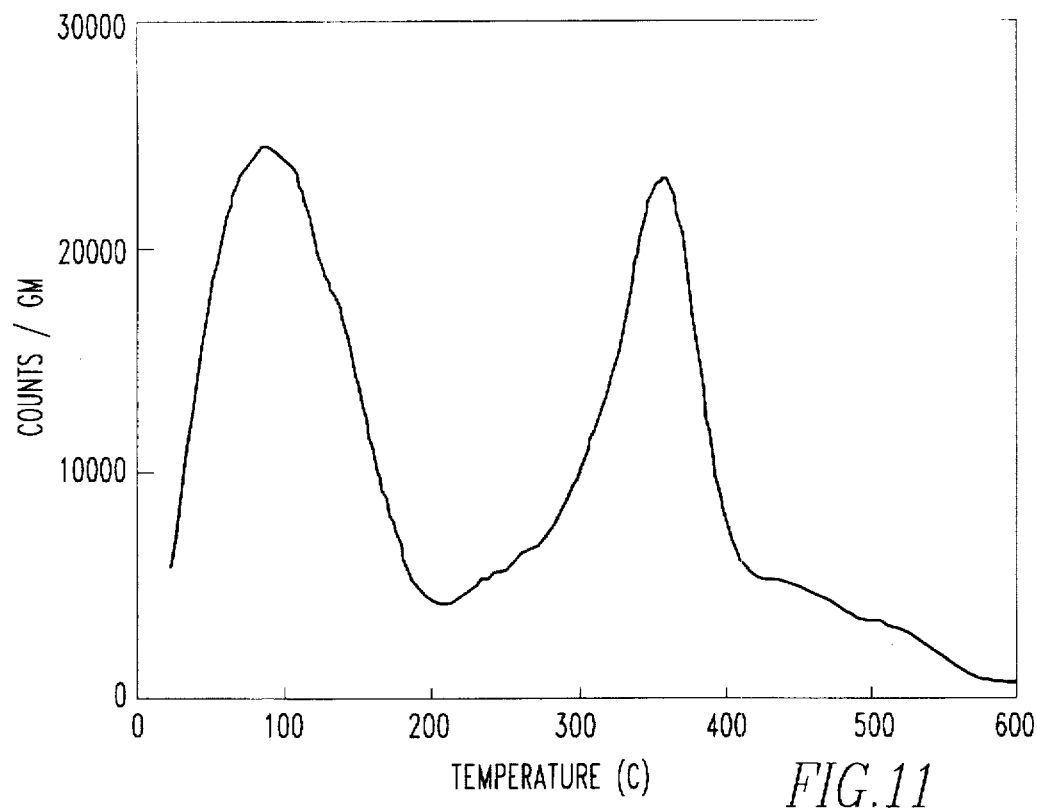
FIG. 11 is a graph showing the temperature at which the hydrotalcite and resulting meixnerite of Example 5 dehydrates.

Basically the same experiment as in Example 1 was re-run using Hydrotalcite A and a hydration solution containing nickel nitrate. One gram of 600° C. activated hydrotalcite A was added to a double deionized water solution containing 0.247 grams of nickel nitrate hexahydrate. After hydration, filtering and drying, the powder had a light green color. The filtrate was crystal clear indicating that the nickel nitrate had been adsorbed. The resulting 600° C. activated mixed metal meixnerite material had a measured B.E.T. surface area of 363 $m^2/g$ Analytical results indicated that the sample had a nickel content of 5.33% (activated weight basis). The TPD pattern is shown in FIG. 11.

EXAMPLE 6

Hydrotalcite A Activated to 600° C., Iron Sulfate Solution Hydration

Figure 12:
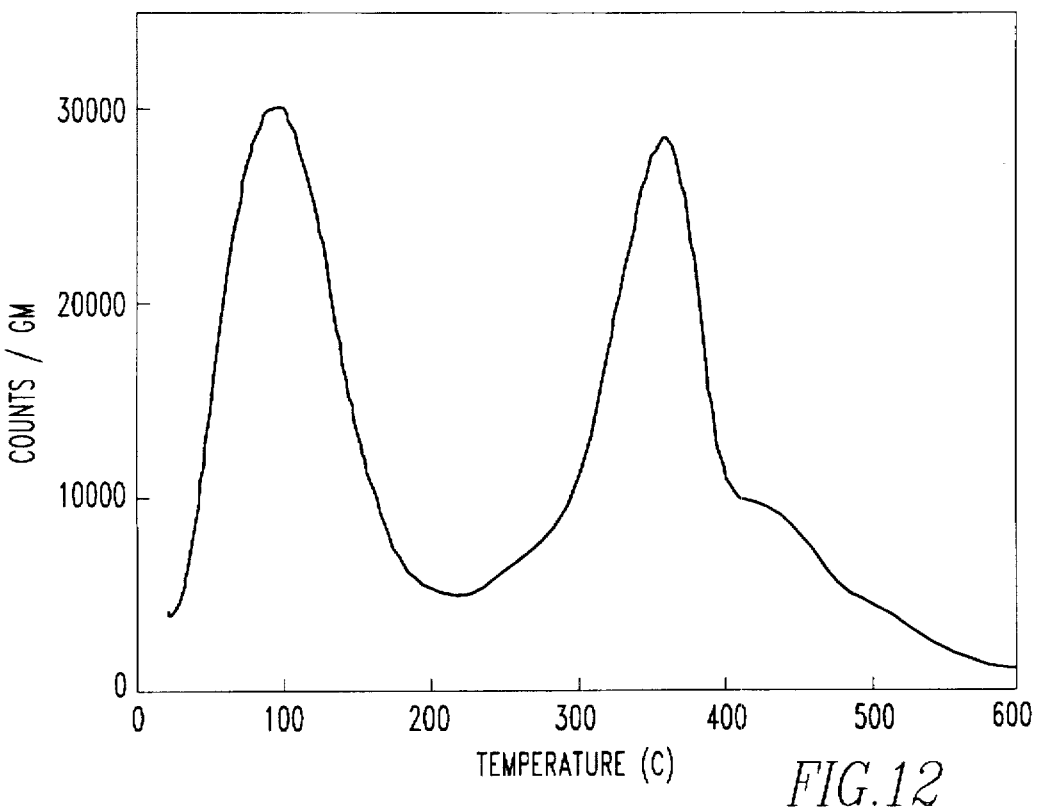
FIG. 12 is a graph showing the temperature at which the iron sulfate loaded meixnerite of Example 6 desorbs.
Figure 13:
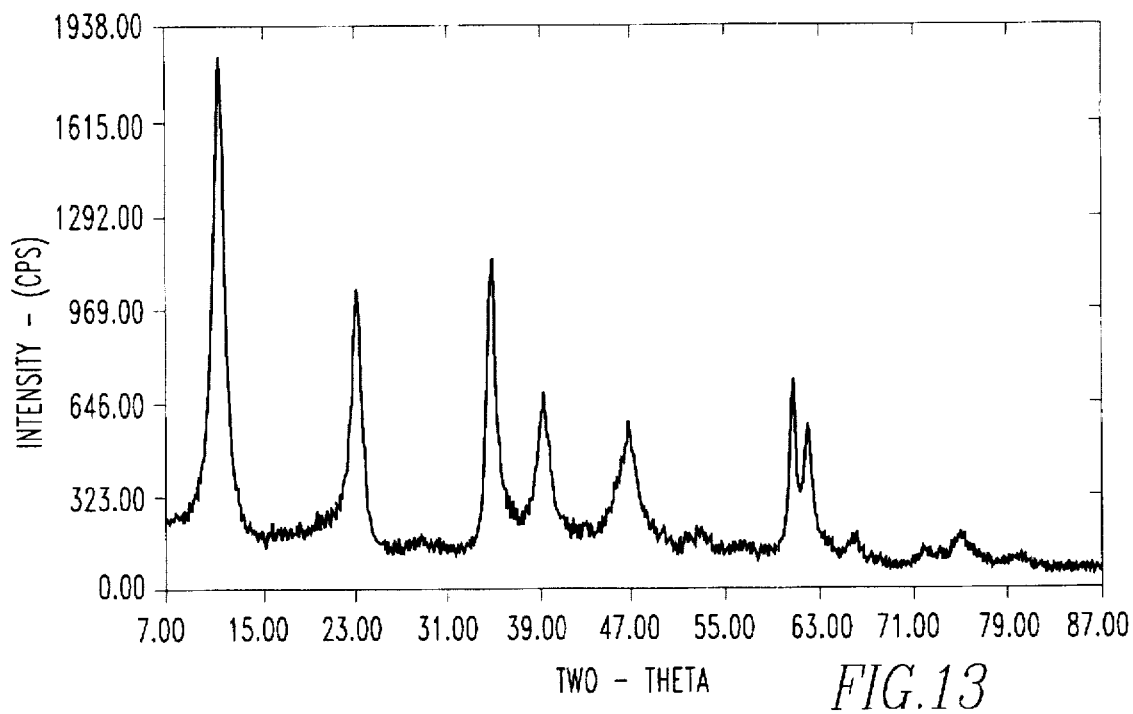
FIG. 13 is the X-ray diffraction pattern of the meixnerite of Example 6 made from hydrotalcite A, activated to 600° C. and using liquid iron sulfate solution hydration.

Basically the same experiment as in Example 5 was re-run using a hydration solution containing iron (II) sulfate. One gram of 600° C. activated hydrotalcite A was added to a double deionized water solution containing 0.2470 g of ferrous sulfate heptahydrate. After hydration, filtering and drying, the powder had a dull green-gray coloration. The filtrate was crystal clear indicating that the iron sulfate had been adsorbed. The resulting 600° C. activated mixed metal meixnerite material had a measured B.E.T. surface area of 318 m²/g. Analytical results indicated that the sample had an iron content of 3.88% (activated weight basis). The TPD pattern is shown in FIG. 12. The XRD pattern as shown in FIG. 13 indicates that the resulting material is a meixnerite type material.

EXAMPLE 7

Hydrotalcite B Activated to 600° C., Cupric Nitrate Solution Hydration—Hydrogen Reduction This experiment began as a variation on previous Example 3 using a larger batch of material so that the hydrogen reduction could take place. Four grams of 600° C. activated Hydrotalcite B was added to a double deionized water solution containing 0.8390 grams of copper (II) nitrate·2.5 $H_2O$. The hydration solution had a dark blue color. After hydration, filtering and drying, the powder had a dark blue color. The filtrate was crystal clear. The powder was sized 10–30 mesh.

Figure 14:
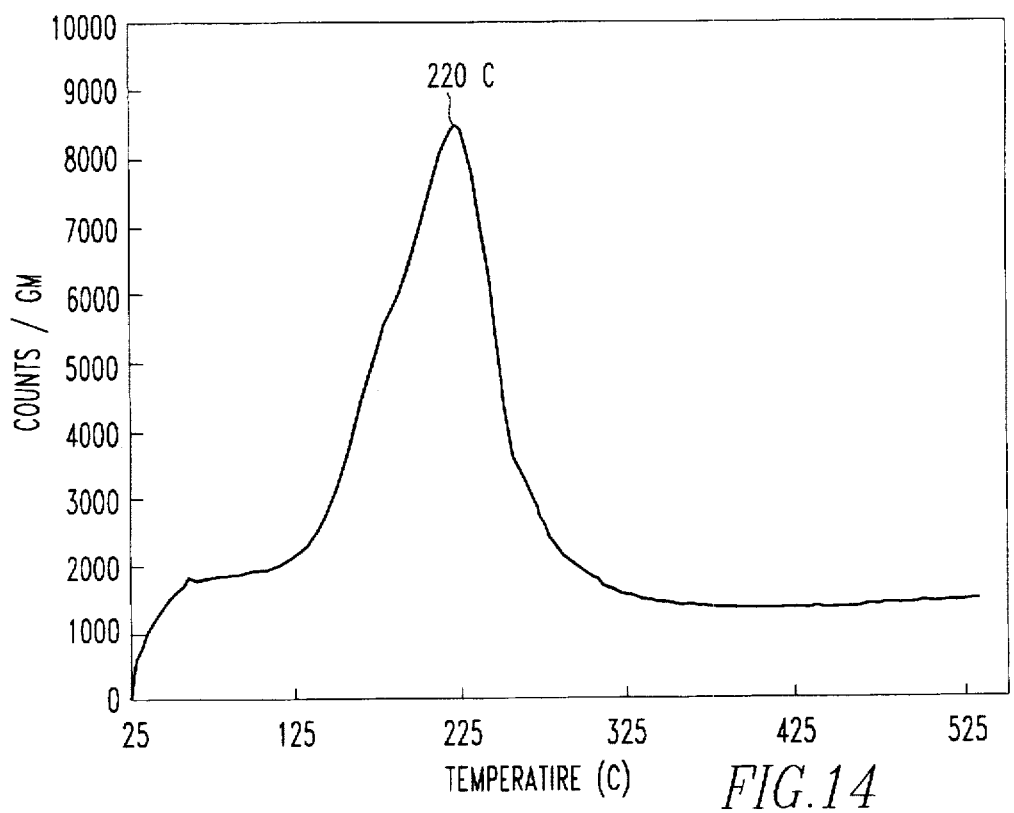
FIG. 14 is a graph showing the temperature at which the activated copper meixnerite of Example 7 reduces and consumes hydrogen.

Approximately 0.5007 grams of the hydrated material was reactivated in a 5% oxygen/95% helium gas mixture to 600° C. to decompose the nitrate and increase the surface area. The reactivated material was an army green color. The material was then cooled to room temperature in an inert atmosphere. The material was then exposed to a 5% hydrogen in argon gas mixture coupled with a 10° C. per minute ramp rate to 525° C. FIG. 14 shows the reduction pattern.

Maximum hydrogen consumption took place at approximately 220° C. It is expected that using other well dispersed metal oxides would also result in a material that reduces easily. Hydrogen consumption was calculated to be approximately $2.8 \times 10^{-4}$ moles. Copper Oxide content was estimated to be $2.02 \times 10^{-4}$ moles based on 0.2698 g activated weight. The reduced material had a black color. The sample was cooled and passivated with several 0.5 cc pulses of oxygen at room temperature. The passivated material had a dark gray color. The sample was removed from the AMI-1 and bottled in a sealed vial. Several days later, a portion of the sample was loaded back into the AMI-1. A one point (20% nitrogen) BET surface area measurement was made. The material had a measured surface are of 320 m²/g.

The 220° C. reduction area is quite similar to that noted by a number of researchers listed in an article by Hurst et al. entitled "Temperature Programmed Reduction", Catal. Rev.-Sci. Eng., 24(2), 233–309 (1982). Hurst et al. concluded the following about TPR: "Temperature programmed reduction (tpr) is a relatively new technique which is highly sensitive and which does not depend on any specific property of the catalyst other than that the species under study be in a reducible condition." Example 7 demonstrates that the copper ions metal can be reduced and that the surface are remains about 300 m²/g. The low reduction temperature indicates excellent metal dispersion. This metal dispersion along with the high surface area demonstrates that the material will most likely have good catalytic potential. It is expected that using other metal salt solutions, including nickel nitrate, cobalt nitrate, iron nitrate and iron sulfate, rather than copper nitrate, would produce a material with similar catalytic potential.

Examples 1–6 are summarized in Table 2.

TABLE 2

Summary Data

| Activated Hydrotalcite Used | % Water Pickup Act. Wt. Basis | % Metal Salt Weight Basis | Post 600° C. Surface Area (m²/g) |
|---|---|---|---|
| B | 121.6 | 8.42 | 352 |
| B | 84.0 | 4.42 | 379 |
| B | 101.3 | 4.83 | 343 |
| B | 120.1 | 5.96 | 322 |
| A | 97.5 | 5.33 | 363 |
| A | 76.6 | 3.88 | 318 |

From the foregoing data, it appears that using an aqueous metal salt solution as the medium for hydration does not negatively affects the B.E.T. surface area of the resulting material. For example, when nickel nitrate is used as the medium for hydration, the resulting B.E.T. surface area remained very high similar to the activated meixnerite. There was no significant difference in the B.E.T. surface area between the resulting activated mixed metal meixnerite with or without supported metals. Thus, nickel additives did not affect the material's ability to achieve an elevated B.E.T. surface area, which is especially pertinent when such materials are used as catalysts. Most likely, the same would hold true for other nickel, cobalt, copper and iron combinations, or other metal loadings such as metal acetates, metal nitrates, metal sulfates, metal halides or combinations of such metal loadings.

Having described the presently preferred embodiments, it is to be understood that the invention may be otherwise embodied within the scope of the appended claims.

What is claimed is:

1. In a process of making a synthetic mixed metal oxide wherein a magnesium aluminum layered double hydroxide material is activated and hydrated in a substantially carbon dioxide-free solution to form a meixnerite, said meixnerite then activated to form a mixed metal oxide having a BET surface area of 290 m²/g or greater, the improvement wherein said carbon dioxide-free solution contains a metal salt.

2. The improvement of claim 1 wherein the synthetic mixed metal oxide includes at least one supported metal or metal oxide.

3. The improvement of claim 2 wherein the supported metal is selected from the group consisting of nickel, cobalt, copper, iron and combinations thereof.

4. The improvement of claim 1 wherein the metal salt includes nickel nitrate.

5. The improvement of claim 1 wherein the metal salt includes cobalt nitrate.

6. The improvement of claim 1 wherein the metal salt includes copper nitrate.

7. The improvement of claim 1 wherein the metal salt includes iron nitrate.

8. The improvement of claim 1 wherein the metal salt includes iron sulfate.

9. The improvement of claim 1 wherein the metal salt is selected from the group consisting of a metal acetate, a metal nitrate, a metal sulfate and combinations thereof.

10. The improvement of claim 1 wherein the metal salt is a metal halide.

11. In a process of making a synthetic mixed metal oxide wherein a magnesium aluminum layered double hydroxide material is activated, cooled and then hydrated in a substantially carbon dioxide-free solution to form a meixnerite, said meixnerite then activated to form a mixed metal oxide, the improvement wherein said carbon dioxide-free solution contains of a metal salt.

12. The improvement of claim 11 wherein the metal salt solution includes nickel nitrate.

13. The improvement of claim 11 wherein the metal salt solution includes cobalt nitrate.

14. The improvement of claim 11 wherein the metal salt solution includes copper nitrate.

15. The improvement of claim 11 wherein the metal salt solution includes iron nitrate.

16. The improvement of claim 11 wherein the metal salt solution includes iron sulfate.

17. The improvements of claim 11 wherein the metal salt is selected from the group consisting of a metal nitrate, a metal acetate, a metal sulfate and combinations thereof.

18. A mixed metal oxide made from a process consisting of:

(a) activating a magnesium aluminum layered double hydroxide material;

(b) hydrating said activated material in a substantially carbon dioxide-free solution containing at least one metal salt; and (c) reactivating said hydrated material in a substantially carbon dioxide-free environment to form said mixed metal oxide thereby having a BET surface area of about 290 $m^2/g$ or greater.

19. The mixed metal oxide of claim 18 which includes at least one supported metal or metal oxide.

20. The mixed metal oxide of claim 19 wherein the supported metal is selected from the group consisting of nickel, cobalt, copper, iron and combinations thereof.

21. The mixed metal oxide of claim 18 wherein the metal salt solution includes nickel nitrate.

22. The mixed metal oxide of claim 18 wherein the metal salt solution includes cobalt nitrate.

23. The mixed metal oxide of claim 18 wherein the metal salt solution includes copper nitrate.

24. The mixed metal oxide of claim 18 wherein the metal salt solution includes iron nitrate.

25. The mixed metal oxide of claim 18 wherein the metal salt solution includes iron sulfate.

26. The mixed metal oxide of claim 18 wherein the metal salt solution comprises a metal salt selected from the group consisting of a metal acetate, a metal nitrate, a metal sulfate and combinations thereof.

27. The mixed metal oxide of claim 18 wherein the metal salt solution comprises metal halide.

28. The mixed metal oxide of claim 18 wherein process step (a) occurs at one or more temperatures between about 500° and 850° C.

29. The mixed metal oxide of claim 18 wherein step (c) occurs at one or more temperatures between about 500° and 850° C.

30. The mixed metal oxide of claim 18 wherein step (c) of said environment includes a helium and oxygen mixture.

31. A mixed metal oxide made from a process consisting of:

(a) activating a magnesium aluminum layered double hydroxide material;

(b) hydrating said activated material in a substantially carbon dioxide-free solution containing copper nitrate and optionally containing an additional metal salt;

(c) reactivating said hydrated material in a substantially carbon dioxide-free environment containing both helium and oxygen to decompose said copper nitrate and, if present, said additional metal salt to form a metal oxide supported on an activated layered double hydroxide; and (d) reducing said mixed metal oxide with hydrogen.

32. The mixed metal oxide of claim 31 which when reactivated has a reduction temperature lower than about 220° C.

33. The mixed metal oxide of claim 31 wherein the supported metal oxide comprises copper oxide and optionally an oxide of a metal selected from the group consisting of nickel, cobalt, iron and combinations thereof.

34. The mixed metal oxide of claim 31 wherein the additional metal salt is selected from the group consisting of a metal acetate, a metal nitrate, a metal sulfate, and combinations thereof.

* * * * *